Nov. 28, 1933.   L. H. MIDDLETON   1,936,850
HORN MOUNTING
Filed May 17, 1932
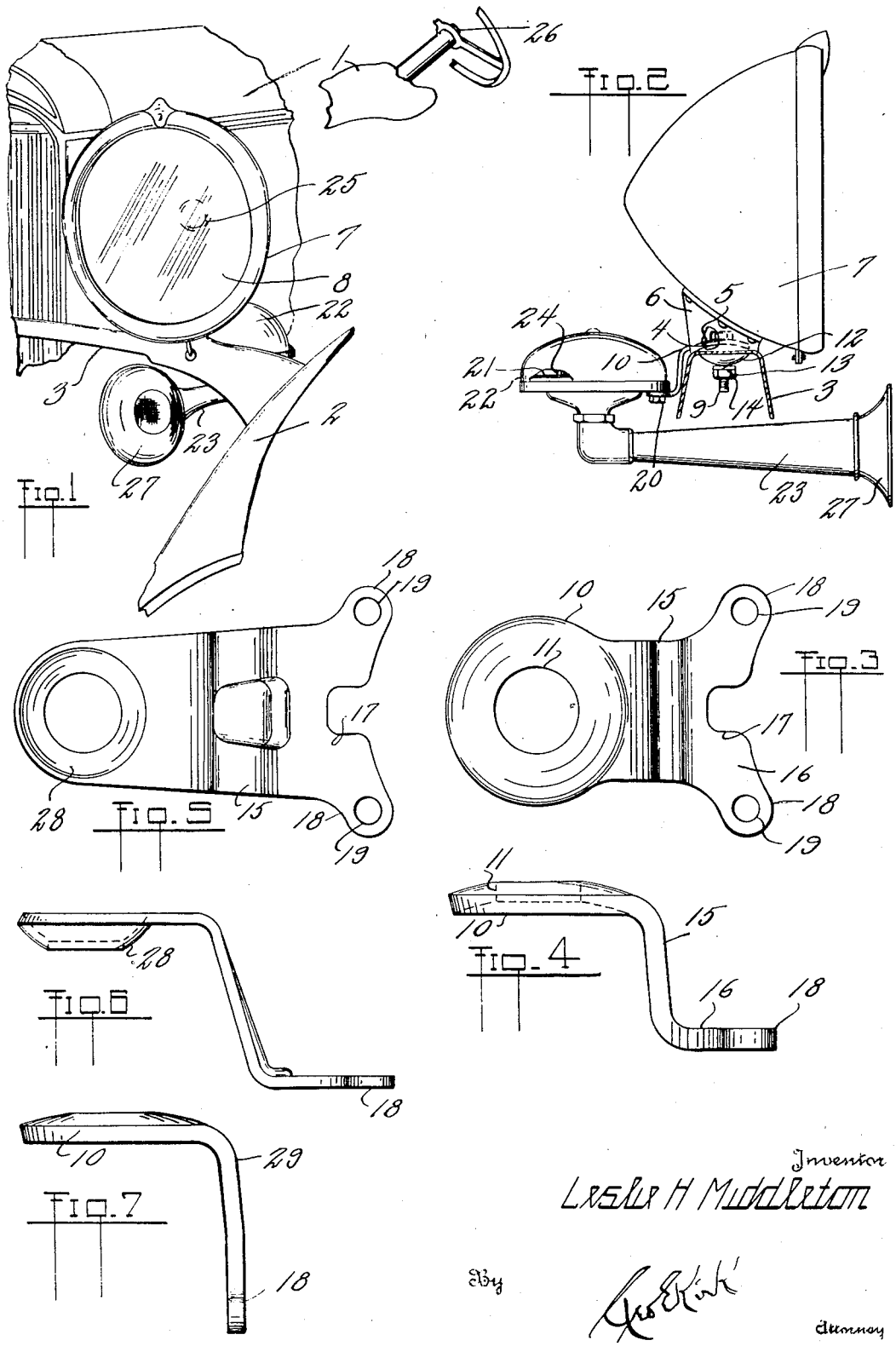
Inventor
Leslie H Middleton
By
Attorney Patented Nov. 28, 1933

1,936,850

UNITED STATES PATENT OFFICE 1,936,850

HORN MOUNTING

Leslie H. Middleton, Adrian, Mich., assignor to Schwarze Electric Company, Adrian, Mich., a corporation of Michigan Application May 17, 1932. Serial No. 611,897

1 Claim. (Cl. 248—20)

This invention relates to mounting plates or brackets.

This invention has utility when incorporated as auxiliary flange or offset sheet metal brackets as clamp assembled incidental to a main or lamp bracket, especially for positioning an electric horn.

Referring to the drawing:

Fig. 1 is a fragmentary view of a motor vehicle having an embodiment of the invention incorporated therein;

Fig. 2 is a side view of the auxiliary mounting and the assembly portions therefrom;

Fig. 3 is a plan view of the mounting bracket of Fig. 2;

Fig. 4 is a side elevation of the bracket of Fig. 2;

Fig. 5 is a view of an embodiment of the bracket having the nesting seat concavo-convex reversely from the showing in Fig. 2;

Fig. 6 is a side elevation of the bracket of Fig. 5; and

Fig. 7 is a view of the bracket having offset or flange in one instead of two directions as shown in Figs. 4 and 6.

Motor vehicle 1 is shown provided with fender 2, cross brace or main bracket 3, having convex seat 4 with which normally may coact complementary seat 5 of projection 6 from lamp housing 7 with headlight 8.

This headlight 8 is assembled in fixed position with the bracket 3 by clamping bolt 9 through the concavo-convex seats between this bracket 3 and the projection 6. There is accordingly, an adjustable snug seating relation for the headlight 8.

In carrying out the invention hereunder, there is introduced between the concavo-convex seat portions 5, 4, concavo-convex seat providing sheet metal member 10 as a spacer thereby snugly located with bolt 9 through opening 11 and supplemental washers 12, 13, with the clamping effected by nut 14. This sheet metal member, having the seat 10 with eye 11, in its extension from the region of the complementary seats 4, 5, has downwardly offset portion 15 with terminal flange 16 shown as having intermediate recess 17, with fork projections 18 therefrom and openings 19, through which may extend bolts 20 in mounting horn having diaphragm 21 in housing 22 with trumpet 23 therefrom. This horn is shown as having electric actuating means 24 therefor, while the headlight 8 is shown as having electric bulb 25 for effecting illumination thereof. Switch 26 as convenient to the driver of the automobile 1 may be operated for controlling the horn for sounding. The trumpet of the horn is shown as extending forwardly under the bracket 3 and terminating in flaring bell 27.

The offset relation for the portions 15, 16, as to the plate or eye 10, may be configured as desired, even for reverse concavo-convex seat 28, and adapted to a nesting position between the base or main bracket and the projection from the head light.

In the event the horn be of the trumpetless type or there be other types wherein a single flange instead of the offsetting flange may be desired, sheet metal bracket 29 of Fig. 7 may be adopted.

It would seem from the foregoing that without departure from the general assembly structure of the usual elements in a motor vehicle, provision is made for external mounting of a sound or other signal device in conjunction with the headlight and its support. This assembly is one which is readily adapted in a simple manner to the wide range of models and types of motor vehicles. Furthermore, it is substantial in its assembly and, due to the general set up, is one in diaphragm type of horns, subjected to a minimum of motor vehicle vibration for disturbance, inasmuch as the fenders serve as absorbing means against transmission of any such vibrations as a disturbing element for the sound signaling.

What is claimed and it is desired to secure by Letters Patent of the United States is:

In a motor vehicle having a headlight mounting comprising a main bracket providing a convex seat, a headlight carrying bracket having a concave seat nesting with the convex seat, a bolt extending through said seats and a nut thereon assembling said parts, a horn mounting for assembly with said parts comprising a bracket having a concavo-convex portion insertable between said seats, and a bifurcated extension from said portion for carrying the horn, said concavo-convex portion being provided with an opening through which the bolt extends, said opening being of relatively larger diameter than the bolt permitting shiftable movement of the horn bracket in any direction between the seats to bring the horn into desired alignment before clamping the nut to complete the assembly.

LESLIE H. MIDDLETON.